United States Patent
Tatarka et al.

(10) Patent No.: US 6,777,047 B1
(45) Date of Patent: Aug. 17, 2004

(54) IONOMERIC, PUNCTURE RESISTANT, THERMOPLASTIC BAG

(75) Inventors: Paul David Tatarka, Woodbridge, IL (US); Paul Nick Georgelos, Naperville, IL (US)

(73) Assignee: Curwood, Inc., Oshkosh, WI (US)

(*) Notice: Subject to any disclaimer, the term of this patent is extended or adjusted under 35 U.S.C. 154(b) by 130 days.

(21) Appl. No.: 09/611,192

(22) Filed: Jul. 6, 2000

(51) Int. Cl.⁷ ............................................ B65D 85/00
(52) U.S. Cl. ...................... 428/35.7; 428/515; 428/516
(58) Field of Search ........................ 428/35.7, 515, 428/516

(56) References Cited

U.S. PATENT DOCUMENTS

| | | | |
|---|---|---|---|
| 3,900,635 A | | 8/1975 | Funderburk, Jr. et al. |
| 4,534,984 A | | 8/1985 | Kuehne |
| 4,755,403 A | | 7/1988 | Ferguson |
| 4,765,857 A | | 8/1988 | Ferguson |
| 4,770,731 A | | 9/1988 | Ferguson |
| 4,863,769 A | | 9/1989 | Lustig et al. |
| 5,302,402 A | | 4/1994 | Dudenhoeffer et al. |
| 5,376,394 A | | 12/1994 | Dudenhoeffer et al. |
| 5,397,640 A | * | 3/1995 | Georgelos et al. .......... 428/349 |
| 5,403,668 A | | 4/1995 | Wilhoit |
| 5,534,276 A | | 7/1996 | Ennis |
| 5,540,646 A | | 7/1996 | Williams et al. |
| 5,545,419 A | | 8/1996 | Brady et al. |
| 5,593,747 A | * | 1/1997 | Georgelos .................. 428/36.7 |
| 5,645,913 A | | 7/1997 | Rogers |
| 5,707,751 A | | 1/1998 | Garza et al. |
| 5,852,152 A | | 12/1998 | Walton et al. |
| 5,928,740 A | | 7/1999 | Wilhoit et al. |
| 6,004,599 A | | 12/1999 | Bert et al. |
| 6,287,613 B1 | * | 9/2001 | Childress et al. .......... 426/129 |

FOREIGN PATENT DOCUMENTS

| | | |
|---|---|---|
| AU | 11228/88 | 8/1988 |
| EP | 0 992 339 | 4/2000 |
| EP | 1 000 973 | 9/2003 |
| GB | 2 328 930 A | 3/1999 |
| GB | 2 339 186 B | 1/2000 |
| JP | 58205765 A | * 11/1983 |

* cited by examiner

Primary Examiner—Sandra M. Nolan
(74) Attorney, Agent, or Firm—Cedric M. Richeson (57) ABSTRACT

A bag combination of: (A) a heat shrinkable film bag having a layer comprising: (a) 45–85 wt. % of a $C_2$ copolymer (55–98° C. m.p.) of $C_6$ or $C_8$; (b) 5–35 wt. % of a second $C_2$ α-olefin copolymer (115–128° C. m.p.); and (c) 10–50 wt. % of a third polymer (60–110° C. m.p.) of an unmodified or anhydride-modified, EVA, EAA or copolymer of $C_2$ and methacrylic acid or an alkyl acrylate; where a+b≧50 wt. % based on a+b+c; and the bag film has a total energy absorption≧0.70 Joule and a 90° C. shrink≧50%; and (B) a bag laminate which covers≧25% of the bag's surface; the laminate film comprising: 5–20 wt. % of (i) an ionomer; and 5–95 wt. % of (ii) a copolymer (55 to 95° C. m.p. and $\bar{M}_w/\bar{M}_n$ of 1.5 to 3.5) of $C_2$ and a $C_6$–$C_8$ α-olefin; 0 to 90 wt. % each of (iii) a copolymer of $C_2$ and a $C_4$–$C_8$ α-olefin (100–125° C. m.p.); (iv) a copolymer (105 to 145° C. m.p.) of propylene and $C_2$ or $C_4$; and (v) a copolymer (125 to 135° C. m.p.) of $C_2$ and $C_6$, $C_8$ or $C_{10}$; and (ii)+(iii)+(iv)+(v)≧80 wt. % based (i)+(ii)+(iii)+(iv)+(v); and the film and bag laminate has a total energy absorption of≧1.2 Joule.

23 Claims, 4 Drawing Sheets

IONOMERIC, PUNCTURE RESISTANT, THERMOPLASTIC BAG

BACKGROUND OF THE INVENTION

The invention relates to patch bags made from polymeric blends, flexible films, and processes of making and using such bags and films. In particular the present invention relates to patch bags useful for packaging bone-in meats and other articles requiring bags which are heat shrinkable while having high resistance to puncture.

Various published patent documents disclose different types of patch bags, and polymer blends, flexible films, packaging and processes for making and/or using the same.

Known patch bags and patch bag structures are disclosed e.g. in U.S. Pat. Nos. 4,534,984; 4,755,403; 4,765,857; 4,770,731; 5,302,402; 5,376,394; 5,534,276; 5,540,646; 5,545,419; 5,645,913; and 6,004,599; and in Australian Application No. 88-11228 (filed Feb. 3, 1988 and published Aug. 4, 1988); and United Kingdom Application No. 2328930 (published Mar. 10, 1999). Film structures have also been disclosed which are relevant to bag formation such as in U.S. Pat. Nos. 4, 863,769; 5,403,668; 5,707,751; and 5,928,740.

Various commercial articles are known to exist in the art.

SUMMARY OF THE INVENTION

According to the present invention a novel polymeric blend comprising: 5 to 20 weight percent of (i) an ionomer polymer e.g. an ethylene-methacrylate acid copolymer whose acid groups have been neutralized partly or completely to forma salt, preferably a zinc or sodium salt; and 5 to 95 weight percent of (ii) a copolymer of ethylene and at least one $C_6$ to $C_8$ α-olefin, wherein said copolymer (ii) has a melting point of from 55 to 95° C., and a $\overline{M}_w/\overline{M}_n$ of from 1.5 to 3.5; and optionally one or more of the following polymers:

0 to 90 weight percent of (iii) a copolymer of ethylene and at least one $C_4$ to $C_8$ α-olefin, wherein said copolymer (iii) has a melting point of from 100 to 125° C.;

0 to 90 weight percent of (iv) a copolymer of propylene and at least one monomer selected from the group of ethylene and butene-1, wherein said copolymer (iv) has a melting point of from 105 to 145° C.; and 0 to 90 weight percent of (v) a copolymer of ethylene and at least one monomer selected from the group of hexene-1, octene-1 and decene-1, wherein said copolymer (v) has a melting point of from 125 to 135° C. Preferably, polymers (ii), (iii), (iv), and (v) have a combined weight percentage of at least 80 weight percent based upon the total weight of these polymers.

A novel monolayer or multilayer film may be made of the foregoing blend, by casting, blowing, or by a trapped bubble technique. In one embodiment of the invention, a heat shrinkable film of the foregoing blend is produced, preferably having a total energy absorption of at least 1.2 Joule.

In another embodiment, the invention comprises: a patch bag made of a combination of: (a) a bag having an inside surface and an outside surface, made of a flexible, thermoplastic, biaxially stretched, heat shrinkable film having at least one layer comprising a blend of at least three copolymers comprising: 45 to 85 weight percent of a first polymer having a melting point of from 55 to 98° C. comprising at least one copolymer of ethylene and at least one comonomer selected from the group of hexene-1 and octene-1; 5 to 35 weight percent of a second polymer having a melting point of from 115 to 128° C. comprising at least one copolymer of ethylene and at least one α-olefin; and 10 to 50 weight percent of a third polymer having a melting point of from 60 to 110° C. comprising at least one unmodified or anhydride-modified copolymer of ethylene and a vinyl ester, acrylic acid, methacrylic acid, or an alkyl acrylate; where the first and second polymers above have a combined weight percentage of at least 50 weight percent based upon the total weight of the first, second and third polymers; and where the bag film has a total energy absorption of at least 0.70 Joule and a shrinkage value at 90° C. of at least 50% in at least one of the machine and transverse directions; and (b) a patch film attached to at least one surface of the bag and covering at least 25% of the bag's surface. This patch film comprises a flexible, thermoplastic film having at least one layer comprising a blend of at least two polymers comprising:

5 to 20 weight percent of (i) an ionomer polymer e.g. an ethylene-methacrylate acid copolymer whose acid groups have been neutralized partly or completely to forma salt, preferably a zinc or sodium salt;

5 to 95 weight percent of (ii) a copolymer of ethylene and at least one $C_6$ to C8 α-olefin, having a melting point of from 55 to 95° C., and a $\overline{M}_w/\overline{M}_n$ of from 1.5 to 3.5;

0 to 90 weight percent of (iii) a copolymer of ethylene and at least one $C_4$ to $C_8$ α-olefin, having a melting point of from 100 to 125° C.; and 0 to 90 weight percent of (iv) a copolymer of propylene and at least one monomer selected from the group of ethylene and butene-1, where the copolymer (iv) has a melting point of from 105 to 145° C.;

0 to 90 weight percent of (v) a copolymer of ethylene and at least one monomer selected from the group of hexene-1, octene-1 and decene-1, where the copolymer (v) has a melting point of from 125 to 135° C.; and polymers (ii), (iii), (iv), and (v) have a combined weight percentage of at least 80 weight percent based upon the total weight of polymers (i), (ii), (iii), (iv), and (v); and wherein the patch film has a total energy absorption of at least 1.2 Joule.

The invention is useful for packaging irregularly shaped objects having sharp projections such as bone-in cuts of meat.

DETAILED DESCRIPTION OF THE INVENTION

The blend, film, bag, process and package of the present invention may be used for packaging various articles including foodstuffs. The invention has particular utility for packaging irregularly shaped objects having sharp projections such as bone-in cuts of meat. Bags and films useful for constructing bags and patchs may be made according to processes, formulations, and teachings of U.S. patent applications Ser. No.: 09/110,455 (filed July 7, 1998 and entitled "Bag for Bone-In Meat Packaging" which application has been published on Jan. 7, 2000 as Canadian Patent Application No. 2265121); 09/401,692 (filed Sep. 22, 1999 and entitled "Puncture Resistant Polymeric Films, Blends and Process" which application has been published on April 12, 2000 as European Patent Document Publication No. 992339); and 09/431,931 (filed Nov. 1, 1999 and entitled "Puncture Resistant, High Shrink Films, Blends and Process" which application has been published on May 17, 2000 as European Patent Document No. 1000973); and the teachings and disclosures of each of these patent applications and published documents are hereby incorporated by reference in their entireties.

Patchs or patch films disclosed herein may be applied to, adhered, affixed or otherwise attached to bag or film structures referenced herein by known means including adhesives, high surface energy, heat fusion and the like and including such means as disclosed in the patents listed in the background of the invention and in particular by adhesive means and/or by the high energy means taught and disclosed in U.S. Pat. No. 5,302,402 which patent is hereby incorporated by reference in its entirety.

Definitions and Nomenclature

In discussing polymer blends, plastic films and packaging, various acronyms are used herein and they are listed below. Also, in referring to blends of polymers a colon (:) will be used to indicate that the components to the left and right of the colon are blended. In referring to film structure, a slash "/" will be used to indicate that components to the left and right of the slash are in different layers and the relative position of components in layers may be so indicated by use of the slash to indicate film layer boundaries. Acronyms commonly employed herein include:

PE-Polyethylene (ethylene homopolymer and/or copolymer of a major portion of ethylene with one or more α-olefins)

EVA-Copolymer of ethylene with vinyl acetate

PVDC-Polyvinylidene chloride (also includes copolymers of vinylidene chloride, especially with vinyl chloride)

EVOH-A saponified or hydrolyzed copolymer of ethylene and vinyl acetate

EAA-Copolymer of ethylene with acrylic acid

VA-Vinyl Acetate $C_2$-ethylene monomer $C_4$-butene-1 monomer $C_6$-hexene-1 monomer $C_8$-octene-1 monomer $C_{10}$-decene-1 monomer $C_2C_x$-a substantially linear copolymer of ethylene and an alpha-olefin where "x" indicates the number of carbon atoms in the comonomer.

Unless specifically noted the polymers defined herein are "unmodified" by any intentional grafting or copolymerization with modifying moieties such as dienes, rubber moieties or acrylic acids. However, the polymers may contain chemicals or additives in small amounts (typically under 1% by weight based on the weight of the polymer) which are present as by-products of the polymer manufacturing process or otherwise added by polymer manufacturers including e.g. catalyst residues, antioxidants, stabilizers, antiblock materials and the like.

Reported and/or measured properties of suitable polymers including those used in the examples below, and of polymers used in the comparative examples are presented in Tables A–C, below. In these tables, Exact and Escorene polymers are the commercial designations of polymers available from Exxon Chemical Company of Houston, Tex., U.S.A. Affinity and Attane polymers are the commercial designations of polymers available from Dow Chemical Company of Midland, Mich., U.S.A. Surlyn and Elvax are the commercial designations of polymers available from Dupont, U.S.A.

TABLE A

| * | Commercial Designation | Copolymer Type | Wt. % Comonomer | Melting Point (° C.) | $\overline{M}_w/\overline{M}_n$ | M.I. (dg/min.) | Density (g/cm³) |
|---|---|---|---|---|---|---|---|
| A | Alathon L5045 | $C_2C_8$ | ND | 131 | ND | 0.45 | 0.950 |
| B | Escorene LD 318 | EVA | 9% VA | ND | ND | 2.2 | 0.930 |
| C | Escorene LD 701 | EVA | 10.5 VA | 97 | ND | 0.2 | 0.930 |
| D | Elvax 3190 | EVA | 25% VA | 77 | ND | 2.0 | 0.95 |
| E | Affinity PF 1140 | $C_2C_8$ | 20% $C_8$ | 95 | 2.4 | 1.6 | 0.895 |
| F | Affinity PL 1880 | $C_2C_8$ | 12% $C_8$ | 100 | 2.4 | 1.0 | 0.902 |
| G | Affinity VP 8770 | $C_2C_8$ | 24% $C_8$ | 83 | 2.4 | 1 | 0.884 |
| H | Attane 4202 | $C_2C_8$ | ND | ND | ND | 3.2 | 0.911 |
| I | Attane 4203 | $C_2C_8$ | ND | 122–123 | 4.46 | 0.80 | 0.905 |
| J | Attane XU 61509.32 | $C_2C_8$ | <10% $C_8$ | 123 | 5.10 | 0.5 | 0.912 |
| K | Exact 3030 | $C_2C_6$ | 13.1% $C_6$ | 97/111 | 2.0 | 2.2 | 0.905 |
| L | Exact 3032 | $C_2C_6$ | 14.4% $C_6$ | 96 | 1.76 | 1.2 | 0.900 |
| M | Exact 4053 | $C_2C_4$ | 19.5% $C_4$ | 70 | 2.00 | 2.2 | 0.888 |
| N | Exact SLX-9092 | $C_2C_6$ | 18.5% $C_6$ | 84/103 | 2.08 | 1.0 | 0.895 |
| P | Exact SLX-9110 | $C_2C_6$ | 16.5% $C_6$ | 88/105 | 2.38 | 0.80 | 0.899 |
| Q | Tafmer 0585X | $C_2C_4$ | 20% $C_4$ | 69 | 2.05 | 0.50 | 0.885 |

*These letter designations are used to refer to these polymers in the following Tables and Examples. Polymers having two or more melting point use a "/" to indicate separate peaks.

TABLE B

| * | Commercial Designation | Co-polymer Type | Wt. % Comonomer | Melting Point (° C.) | M.I. (dg/min.) | Density (g/cm³) |
|---|---|---|---|---|---|---|
| R | Eltex P KS 409 | $C_3C_2$ | ND | 134 | 5 | 0.895 |
| S | Surlyn 1650 | Zn—$C_2$MAA Ionomer | 12% MAA | 97 | 1.6 | 0.950 |

TABLE B-continued

| * | Commercial Designation | Co-polymer Type | Wt. % Comonomer | Melting Point (° C.) | M.I. (dg/min.) | Density (g/cm³) |
|---|---|---|---|---|---|---|
| T | Surlyn 1705-1 | Zn—C₂MAA Ionomer | 15% MAA | 95 | 5.5 | 0.950 |
| U | Surlyn 1707 | Na—C₂MAA Ionomer | 15% MAA | 92 | 0.90 | 0.950 |
| V | Surlyn 1855 | Zn—C₂MAA-IBA Ionomer | ND | 88 | 0.90 | 0.94 |
| W | Surlyn 8945 | Na—C₂MAA Ionomer | ND | 88 | 4.0 | 0.95 |
| X | Surlyn 9945 | Zn—C₂MAA Ionomer | ND | 89 | 4.0 | 0.97 |
| Y | Surlyn 9150 | Zn—C₂MAA Ionomer | ND | 82 | 4.5 | 0.97 |
| Z | Surlyn 8140 | Na—C₂MAA Ionomer | ND | 87 | 2.6 | 0.96 |

* These letter designations are used to refer to these polymers in the following Tables and Examples.

TABLE C

| * | First Additive (wt. %) | Second Additive (wt. %) | Carrier Resin | Carrier Density (g/cm³) | Carrier M.I. (dg/min.) |
|---|---|---|---|---|---|
| AA | 1.4% oleamide | 3.3% fluoroelastomer | VLDPE | 0.913 | 3.2 |
| BB | 5% erucamide | 3% fluoroelastomer | VLDPE | 0.910 | 2.0 |
| CC | 1.4% oleamide | 3.3% fluoroelastomer | VLDPE | 0.910 | 2.0 |
| DD | 3% oleamide | 6% fluoroelastomer | VLDPE | 0.910 | 2.0 |
| EE | 10% stabilizer | — | VLDPE | 0.910 | 2.0 |
| FF | 1.25% erucamide | 5% fluoroelastomer | VLDPE | 0.910 | 2.0 |
| GG | 2.25% oleamide | 4.4% fluoroelastomer | VLDPE | 0.910 | 2.0 |

Figure 1:
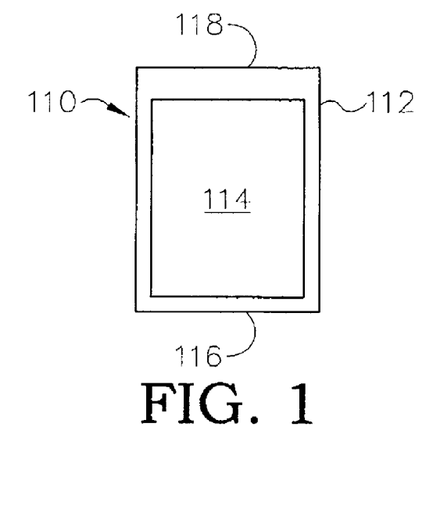
FIG. 1 is a schematic view of a patch bag according to the present invention.

Referring to the drawings, FIG. 1 shows a patch bag of the present invention generally indicated at 110. The patch bag comprises a bag portion 112 and a patch 114 adhered to an outer surface of the bag. The bag preferably is formed by collapsing a tubular film to its flat width and then heat sealing across the flat width to form a closed bottom 116 of the bag. Bag top 118 is open.

The patch 114 generally is smaller in area than the bag as shown(not to scale) but it also can have a width equal to or greater than the bag width so that a maximum surface area of the bag is covered. While the patch is shown applied to only one side of the bag, patches can be applied to both sides as shown, for example, in U.S. Pat. No. 5,545,419.

Both the bag portion and patch are formed of a biaxially oriented heat-shrinkable thermoplastic film. The bag film is typically and preferably a multilayer film and the patch film is typically and preferably a monolayer film, although a multilayer patch is contemplated by the present invention.

Preferably films for patch and bag are heat shrinkable as that term is defined herein. More preferably, advantageous embodiments may have an unrestrained shrinkage of at least 20% in each direction and most preferably the shrink is at least 40% or more in both directions.

Figure 2:
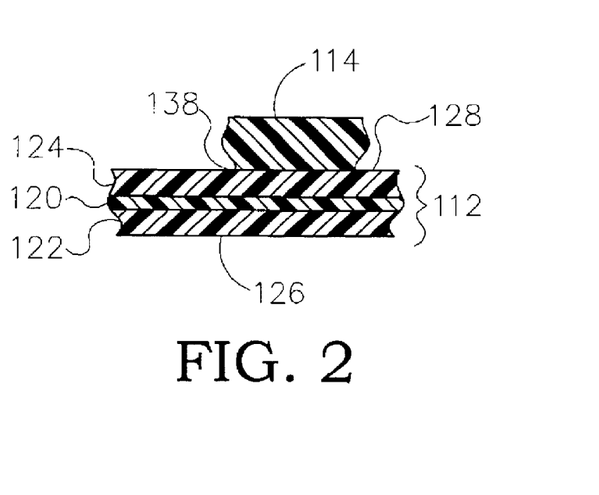
FIG. 2 is a sectional view of a portion of the patch bag wall(not to scale).

As shown in FIG. 2, the film forming bag portion 112 preferably is a multilayer film including a barrier layer 120 disposed between an inner heat sealing layer 122 and an outer abuse layer 124. The inner layer 122 defines the inner surface 126 of the bag and abuse layer 124 defines an outer surface 128 of the bag. The patch 114, as shown in FIG. 2, is preferably a monolayer film adhered to the bag outer surface 128.

The terms "barrier" or "barrier layer" as used herein means a layer of a multilayer film which acts as a physical barrier to gaseous oxygen molecules. Advantageous for packaging of oxygen sensitive materials such as fresh red meat, a barrier layer material in conjunction with the other film layers will provide an oxygen transmission rate($O_2$TR) of less than 70 cc per square meter in 24 hours at one atmosphere at a temperature of 73° F. (23° C.) and 0% relative humidity a film across the thickness of a film used to form a barrier bag.

Barrier layer 120 is formed of any suitable oxygen barrier material or blend of materials, for example, ethylene-vinyl alcohol copolymer (EVOH) or copolymers of vinylidene chloride (VDC) such as VDC-vinyl chloride (VDC-VC) or VDC-methylacrylate (VDC-MA). For certain embodiments of the present invention, a preferred barrier layer comprises a blend of VDC-VC and VDC-MA, and especially preferred is a blend of 85 wt. % VDC-MA and 15 wt. % VDC-VC. For certain other embodiments of the invention high barrier EVOH is preferred.

The film comprising the bags to which a patch film may be adhered may vary in thickness, from 1.5 to 7 mils or more(38.1–178μ), but the bag film 112 in typical embodiments is generally 2.25 to 3.5 mils (57 to 89. In this structure, the abuse layer 124 may typically be 0.68 to 0.9 mils (17 to 22.8μ) thick, the barrier layer 120 may be 0.225 to 0.3 mils (6 to 8μ) thick, and the seal layer 122 may be 1.35 to 1.8 mils (34 to 46μ) thick.

In one embodiment of the present invention, substantially the same blend of polymers form both the heat seal layer 122 of the multilayer bag film 112 and the patch film 114. In this embodiment, the heat seal layer and the patch film is a blend of at least two, preferably three and most preferably at least four polymers, at least one of which is an ionomer and at least one of which is a copolymer of ethylene and a $C_6$–$C_8$ alpha-olefin having a melting point of from 55 to 95° C. and a $\overline{M}_w/\overline{M}_n$ of from 1.5 to 3.5; and optionally containing: a polymer having a melting point of from 115 to 128° C. comprising at least one copolymer of ethylene and at least one α-olefin; a polymer having a melting point of from 60 to 110° C. comprising at least one unmodified or anhydride-modified copolymer of ethylene and a vinyl ester, acrylic acid, methacrylic acid, or an alkyl acrylate; and/or a copolymer of propylene and at least one monomer selected from the group of ethylene and butene-1, wherein said copolymer (iv) has a melting point of from 105 to 145° C.

In one embodiment, the present invention comprises a polymeric blend of 5 to 20 weight percent of (i) an ionomer polymer; and 5 to 95 weight percent of (ii) a copolymer of ethylene and at least one $C_6$ to $C_8$ α-olefin, wherein said copolymer (ii) has a melting point of from 55 to 95° C., and a $\overline{M}_w/\overline{M}_n$ of from 1.5 to 3.5. This blend may optionally further comprise one or more of the following: (iii) a copolymer of ethylene and at least one $C_4$ to $C_8$ α-olefin, wherein said copolymer (iii) has a melting point of from 100 to 125° C.; (iv) a copolymer of propylene and at least one monomer selected from the group of ethylene and butene-1, wherein said copolymer (iv) has a melting point of from 105 to 145° C.; and/or (v) a copolymer of ethylene and at least one monomer selected from the group of hexene-1, octene-1 and decene-1, wherein said copolymer (v) has a melting point of from 125 to 135° C. Preferably, in certain preferred embodiments the blend will comprise at least 5% by weight, more preferably at least 10%, and optionally greater than 50%, of polymers (iii), (iv), and/or (v).

Polymer blends of the present invention may be manufactured into various useful articles e.g. cast films using e.g. a slot die, or conventional blown films where a tubular film is produced directly from the die melt. Molded articles, thermoformed articles, blow molded sheets, may also be produced as well as rigid or flexible bodies which are solid, hollow or foamed. Films may be uni- or biaxially oriented by known methods such as by paired rollers operating to stretch film longitudinally in the machine direction and/or by tenters or radial bubble expansion. In a preferred embodiment, extrusion and orientation by a trapped bubble or double bubble process of the type described in U.S. Pat. No. 3,456,044 is used. In a preferred process for making an oriented or heat shrinkable film, a primary tube comprising the inventive plastic blend is extruded, and after leaving the die is inflated by admission of air, cooled, collapsed, and then preferably oriented by reinflating to form a secondary bubble with reheating to the film's orientation (draw) temperature range. Machine direction (M.D.) orientation is produced by pulling or drawing the film tube e.g. by utilizing a pair of rollers traveling at different speeds and transverse direction (T.D.) orientation is obtained by radial bubble expansion. The oriented film is set by rapid cooling. Suitable machine direction and transverse direction stretch ratios are from about 3:1 to about 5:1 with a ratio of about 4:1 preferred.

Figure 3:
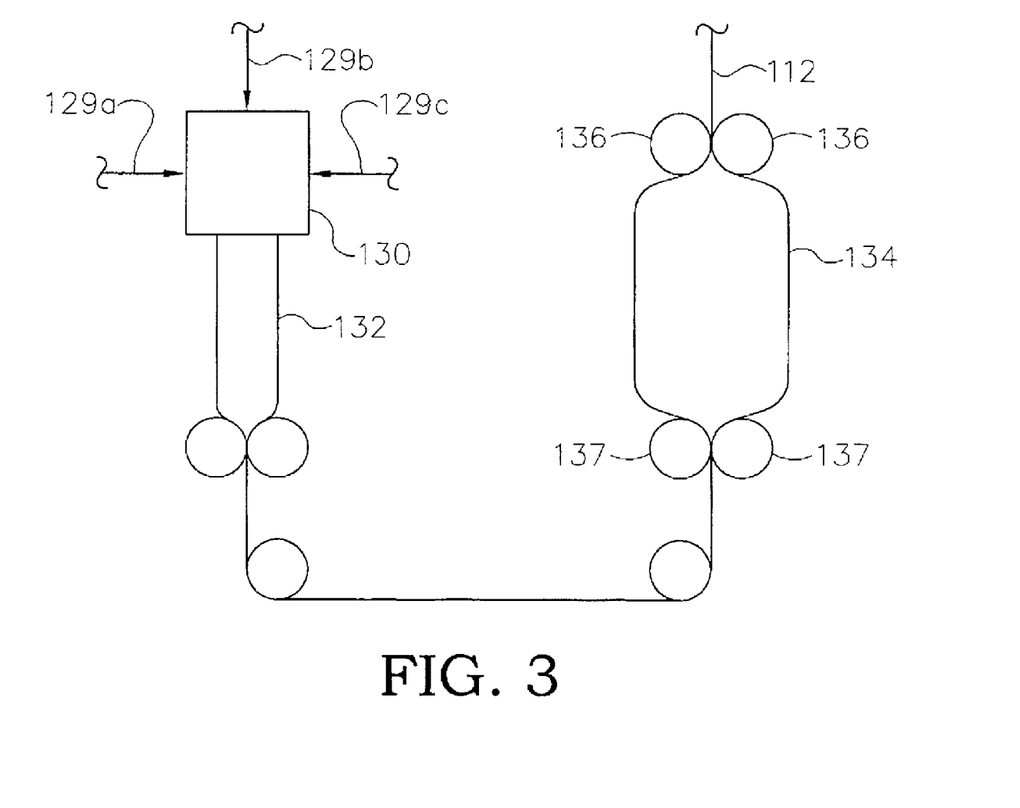
FIG. 3 is a schematic view illustrating steps of the film orientation process.

Referring now to FIG. 3, a double bubble or trapped bubble process is shown. The polymer blends making up the several layers are coextruded by conveying separate melt streams 129a, 129b, and 129c to the die 130. These polymer melts are joined together and coextruded from annular die 130 as a relatively thick walled multilayered tube 132. The thick walled primary tube 132 leaving the extrusion die is cooled and collapsed and then is reheated to below the melting point of the layers being oriented and inflated with a trapped fluid, preferably gas, most preferably air, to form a secondary bubble 134. The inflation which radially expands the film provides transverse direction (TD) orientation. Orientation in the machine direction (MD) is accomplished by adjusting the relative speed and/or size of nip rollers 136 relative to nip rollers 137 to stretch (draw) the film in the machine direction.

In the case of the multilayer bag film, the biaxial orientation preferably is sufficient to provide a multilayer film with a total thickness of from about 1.5 to 7 mils or more, preferably between 2.25 and 3.5 mils (64 to 89µ).

For the monolayer patch film, the process is similar but using a single extruder or multiple extruders running the same polymeric formulation to produce a thicker primary tube, and biaxial orientation is sufficient to provide a monolayer film having a total thickness of between 1 to 7 mil, and more typically from about 2 to 4 mils and is generally in the same stretch ratio range as the bag film, namely about 3:1 to 5:1 for both the MD and TD.

After orientation, the tubular patch film is slit longitudinally and laid flat. The bag film is collapsed to its flat width without slitting. One flattened surface of the bag film (the patch receiving surface 128) and one surface 138 of the patch film are each exposed to high energy to increase the surface tension of these films. This may be accomplished by corona discharge, for example, although other methods may be used such as flame, plasma or ultraviolet treatment among others. The treatment should increase the surface tension of each treated surface, as measured by wetting tension, to at least about 38 dynes/cm and preferably to about 44 to 46 dynes/cm. Advantageously, the patch film may have a higher surface tension.

After the surface energy of the bag and patch film have been raised, the patch film is cut into individual patches which are laid at spaced intervals along the flattened bag film. Next, individual bags are made by forming a heat seal across the flattened bag film and then severing the bag film to form the individual bags as shown in FIG. 1. The method and apparatus for applying the patch film and making individual bags is described in U.S. Pat. No. 5,302,402, the disclosure of which is hereby incorporated by reference in its entirety. Advantageously, in certain other preferred embodiments the patch may be adhered or bonded by chemical or polymeric adhesives or by heat fusion to the bag.

Films of the present invention may be monolayer or multilayer thermoplastic polymeric flexible films of 10 mils (254 microns) or less. The film embodiments of the invention may be formed into bags of various sizes. By "flatwidth" is meant the transverse width of a flattened tubular film. The flatwidth is also equal to ½ of the circumference of the tubular film.

Typical inventive films may have a thickness of 1.5–3.5 mil (38.1–88.9 microns), although suitable films as thick as 5–7mils (127–178 microns) or thicker, or as thin as 1 mil (25.4 microns) or thinner may be advantageously employed, e.g. for packaging foodstuffs. Especially preferred for packaging are multilayer films having a thickness of between about 2 to 3 mils (50.8–76.2 microns). Such films have good abuse resistance. Films thinner than 2 mils are less abuse resistant and more difficult to handle in packaging processes. Films of 4–7 mils (102–178µ) have extremely good abuse resistance and puncture resistance. Films greater than 7 mil (178µ) may be advantageous in some demanding applications. Films of the present invention may have at least one layer comprising the inventive polymer blend described above. These inventive ionomer-containing films are useful as patch films which advantageously may be attached to bags or other films, for example, such as those described above in U.S. patent applications Ser. No.: 09/110,455; 09/401,692; and 09/431,931.

Preferred films are heat shrinkable. Preferred films may also provide a beneficial combination of one or more or all of the below noted properties including high puncture resistance(ram and/or hot water), high shrinkage values, low haze, high gloss, and high hot water seal strengths.

Unless otherwise noted, the physical properties reported herein and in the examples below are used to describe the present invention. These properties are measured by either the test procedures described below or tests similar to the following methods.

Average Gauge: ASTM D-2103
Tensile Strength: ASTM D-882, method A
1% Secant Modulus: ASTM D-882, method A
Oxygen Gas Transmission Rate ($O_2$GTR): ASTM D-3985-81
Elmendorf Tear Strength: ASTM D-1922
Percent Elongation at Break: ASTM D-882, method A
Molecular Weight Distribution: Gel permeation chromatography
Gloss: ASTM D-2457, 45° Angle
Haze: ASTMD-1003–52

Melt Index: ASTM D-1238, Condition E (190° C.) (except for propene-based (>50% $C_3$ content) polymers tested at Condition L(230° C.))

Melting Point: ASTM D-3418, peak m.p. determined by DSC with a 10° C./min. heating rate.

Vicat Softening Point (Vsp): ASTM D-1525–82

All ASTM test methods noted herein are incorporated by reference into this disclosure.

Shrinkage Values: Shrinkage values are obtained by measuring unrestrained shrink of a 10 cm square sample immersed in water at 90° C. (or the indicated temperature if different) for ten seconds. Four test specimens are cut from a given sample of the film to be tested. The specimens are cut into squares of 10 cm length M.D. by 10 cm. length T.D. Each specimen is completely immersed for 10 seconds in a 90° C. (or the indicated temperature if different) water bath. The specimen is then removed from the bath and the distance between the ends of the shrunken specimen is measured for both the M.D. and T.D. directions. The difference in the measured distance for the shrunken specimen and the original 10 cm. side is multiplied by ten to obtain the percent of shrinkage for the specimen in each direction. The shrinkage of 4 specimens is averaged and the average M.D. and T.D. shrinkage values reported. The term "heat shrinkable film at 90° C." means a film having an unrestrained shrinkage value of at least 10% in at least one direction at 90° C.

Shrink Force: The shrink force of a film is that force or stress required to prevent shrinkage of the film and was determined from two samples taken from each film. Each film sample was cut 1" (2.54 cm) wide by 7" (17.8 cm) long in the machine direction and 1" (2.54 cm) wide by 7" (17.8 cm) long in the transverse direction. The average film thickness was determined and recorded. Each film sample was then secured between the two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was recorded. At the end of this time, the film sample was removed from the bath and allowed to cool to room temperature whereupon the force in grams at room temperature was also recorded. The shrink force for the film sample was then determined from the following equation wherein the results is obtained in grams per mil of film thickness (g/mil):

$$\text{Shrink Force(g/mil)} = F/T$$

wherein F is the force in grams and T is the average thickness of the film samples in mils.

Impulse Seal Range

The impulse sealing range test determines the acceptable voltage ranges for impulse sealing plastic films. A Sentinel Model 12-12AS laboratory sealer manufactured by Packaging Industries Group, Inc., Hyannis Mass., U.S.A. was used. This impulse sealer is equipped with a replacement sealing ribbon (available from Koch Supplies of Kansas City, Mo.) for a Multivac AG100 brand packaging machine. In this test, two 4 inch wide (T.D. direction) samples are cut from a tubular film. The impulse sealer has controls for coolant flow, impulse voltage and time, and seal bar pressure. These controls except for impulse voltage are set at the following conditions:

| | |
|---|---|
| 0.5 | seconds impulse time (upper ribbon only) |
| 2.2 | seconds cooling time |
| 50 | psi (345 kPa) jaw pressure |
| 0.3 | gallon per minute (1 liter per minute) of cooling (about 75° F. (22° C.)) water flow |

One of the samples is folded in half for use in determining a minimum sealing voltage. This folding simulates folding which may inadvertently occur during conventional bag sealing operations. The folded sample which now has four sheets or portions of film (hereinafter referred to as "sheet portions") is placed into the sealer and by trial and error the minimum voltage to seal the bottom two sheet portions to each other was determined.

The maximum voltage is determined by placed 2 sheet portions in the sealer and activating the seal bar. The film sample is manually pulled with about 0.5 lbs. of force and the voltage which does not cause burn through or significant distortion of the seal is determined.

Hot Water Seal Strength (HWSS) Test

In commercial use, food packaging bags are filled with food product, e.g. poultry, then evacuated through the mouth end of the bag and sealed, e.g., by an impulse sealing machine. The strength of seals of heat shrinkable bags is measured by determining the time for a seal to fail when under certain conditions the seal is immersed in hot water e.g. at 95° C. The HWSS test is designed to test the seal integrity of a bag's seals by simulating a bagged food shrinking and/or cooking packaging application. The hot water seal strength is measured by a test described as the "restrained shrinkage-seal strength test" in Funderburk et al U.S. Pat. No. 3,900,635 which patent is hereby incorporated by reference. The seal strength of the sealed test bags is determined using a metal frame fabricated from wire to simulate the contours of a bulky food such as whole poultry, and the frame is placed inside the test bag. The so-opened bag and test frame is then immersed in water at 95° C.±0.5° C. with the seal at the bottom end, and the time to failure of the seal was measured for ten bags and the average is reported along with the minimum and maximum time to failure. Times are measured in seconds up to a maximum of 300 seconds. After 300 seconds, the test of each sample was discontinued regardless of failure and averages were calculated using 300 seconds for intact bags. The maximum and minimum sealing temperatures for which bags may be effectively sealed is determined by trial and error to provide information about the sealing range over which test bags may be sealed. A wide sealing range is desirable to minimize operator error and seal failure due to e.g. drift of temperature control and environmental conditions and other process variations such as e.g. film thickness.

Tensile Seal Strength (Seal Strength) Test

Five identical samples of film are cut 1 inch (2.54 cm) wide and at least 5 inches (77 cm) long with a 1 inch (2.54 cm) wide seal portion centrally and transversely disposed. Opposing end portions of a film sample are secured in opposing clamps in a temperature controlled chamber of an Instron 4501 Universal Testing Instrument. The film is secured in a taut snug fit between the clamps without stretching prior to beginning the test. The test chamber door is closed and the chamber is heated to the test temperature at which time the instrument is activated to pull the film via the clamps transverse to the seal at a uniform rate of 5 inches (127 cm) per minute until failure of the film (breakage of film or seal, or delamination and loss of film integrity). The test temperature and lbs. force at break are measured and recorded. The test is repeated for four additional samples and the average lb. at break reported.

Hot Water Puncture Test

Hot water puncture values are obtained by a hot water puncture test as follows. Water is heated to 95±1° C. A straight stainless steel metal rod of ⅜ inch (0.95 cm) diameter is formed into a probe by shaping one end to a conical point. This sharpened point has the configuration of a right circular cone, and the angle between the cone axis and an element of the conical surface at the vertex is 37°. This sharp point is then rounded to a spherical tip of about ¹⁄₁₆ inch diameter. The pointed rod is fastened to a wooden block so that the rounded point projects 1½ inches (3.8 cm) beyond the end of the 7 inch (17.8 cm) long rectangular wooden block. A specimen about 3 inches (7.6 cm) wide in the transverse direction (TD) and about 18 inches (45.7 cm) long is cut from the test sample material. One end of the specimen is placed on the end of the wooden block opposite the pointed rod. The specimen is wrapped around the end of the sharpened rod and back to the wooden block on the opposite side, where it is secured. The film thickness in the area of contact with the sharpened rod is measured in order to assure that the film specimen thickness is truly representative of the given test sample material. The specimen and pointed rod are quickly immersed five inches (12.7 cm) into the hot water and a timer is started. The timer is stopped when the point punctures the film specimen or at 120 seconds without puncture, and the time recorded. The test procedure is repeated 5 more times with new specimens. The times required for penetration are then averaged for the six TD specimens. Resistance to puncture times of below 6–7 seconds are generally considered unacceptable, while times of 20 seconds or more are good, 60 seconds or more are very good and 120 seconds or more are excellent.

Ram Puncture Test

The ram puncture test is used to determine the maximum puncture load or force, and the maximum puncture stress of a flexible film when struck by a hemispherically shaped striker. This test provides a quantitative measure of the puncture resistance of thin plastic films. Values of this test will differ from those generated by a dynamic puncture test due to differences in striker geometry, loading rate and geometry and available energy.

Figure 4:
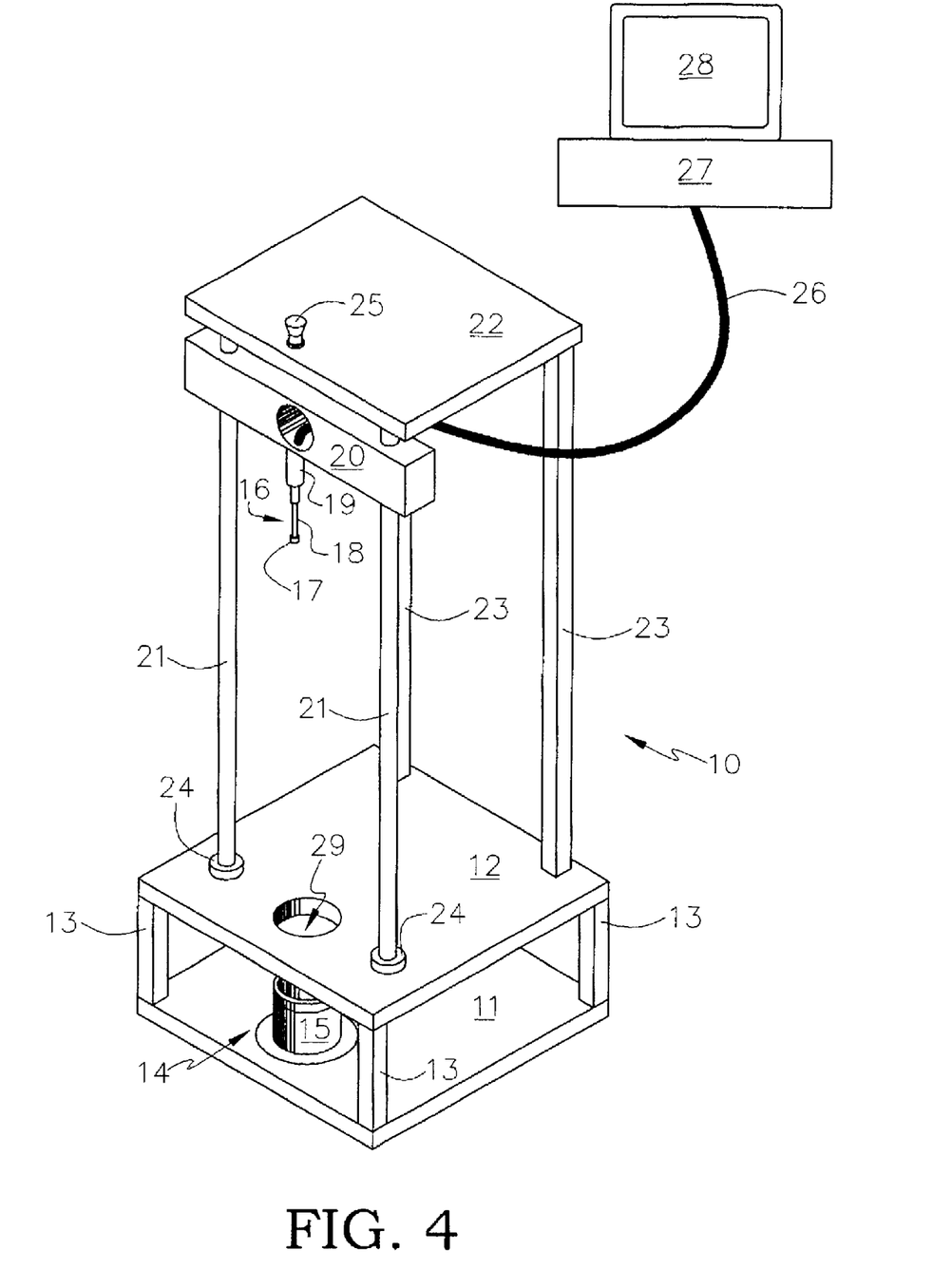
FIG. 4 is a schematic view of a ram puncture tester.

Referring to FIG. 4, a schematic drawing (not to scale) of a ram puncture tester 10 is depicted having a base 11 and a shelf 12 separated by fixed pillars 13 forming a sample placement area 14.

In conducting the ram puncture test, an approximately 5 inch (12.7 cm) diameter film sample is obtained and its thickness measured and recorded. This sample is clamped in place across an approximately 3 inch (7.6 cm) diameter circular opening in a ring fixture 15 by holding the film sample taut, but not stretched, between the planar circular ring fixture 15 having a compressive O-ring and an opposing metal ring to secure the film in a circle. This fixture 15 is positioned to hold the film plane perpendicular to the path of striker 16 located above the film. The striker 16 travels downward in the direction of and under the influence of the gravitational force of the Earth. The striker 16 is a 3.95 mm diameter steel ball 17 welded to a 5 cm long steel shaft 18 of 95 mil (0.24 cm) diameter. The shaft is attached to a 50 lb full-scale Dytran™ piezoelectric load cell 19 (available from Dytran Instruments, Inc., U.S.A.) which is affixed to an aluminum crosshead 20. The crosshead assembly forms a 3.00 kg mass which travels vertically, under the influence of gravity, along 2 hardened steel guide shafts 21 which are held in a fixed spaced apart position parallel position by attachment to shelf 12 at the bottom and top plate 22 at the top. Back pillars 23 provide stability to the tester 10. Four linear bearings are press-fit into the crosshead to provide precise, repeatable, low-friction travel along the guide shafts 21 downward to shock absorber pads 24. The striker 16 may be actuated by latch release knob 25, and load cell information is passed via line 26 to a low impedance voltage mode (LIVM)(power supply not shown) which is connected to a data acquisition system in computer 27 having a monitor 28. Shelf 12 has a circular opening 29 permitting striker 16 to contact the film sample contained in fixture 15.

Figure 5:
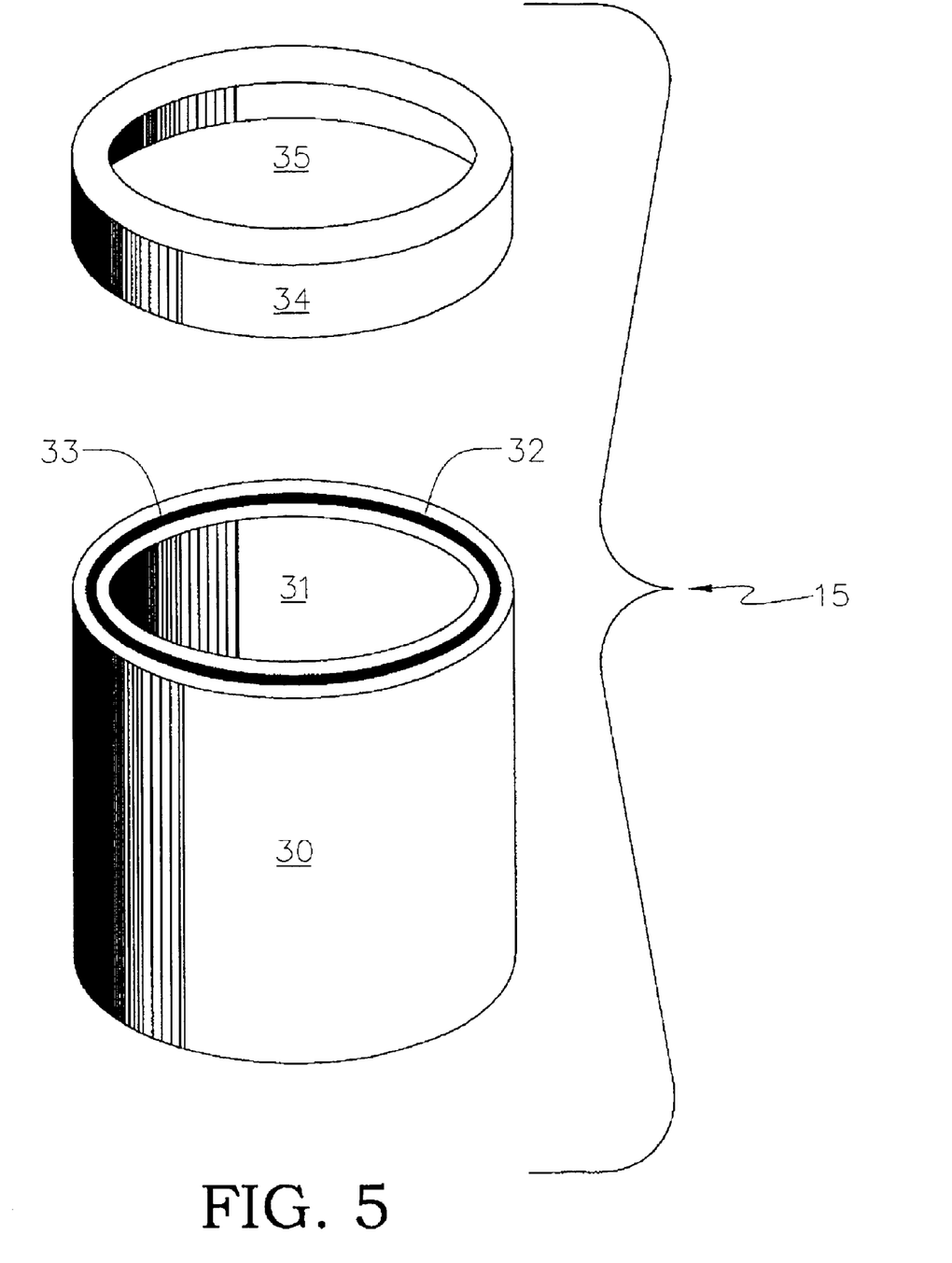
FIG. 5 is an exploded view of a specialty film holder.

Referring now to FIG. 5, films are tested by circumferentially clamping them over a 3" diameter hole using a specialty film holder fixture 15. The film holder 15 is an aluminum tube 30 having a circular opening 31. The tube 30 has a circular machined groove 32 to accept a rubber O-ring 33 at one end. The film (not shown) is placed across the O-ring 33 and a mating upper cylindrical section 34 having an opening 35 is firmly held without stretching against the film by clamps (not shown). The clamped film is then centered underneath the puncture tip at the base of the drop tower (see FIG. 4). This places the plane of the film surface 28.4 cm below the tip of the hemispherical striker tip 17 (drop height). The crosshead 20 is released and propelled by gravity toward the clamped film at a velocity $v_0$ which is kinematically related to the drop height.

Figure 6:
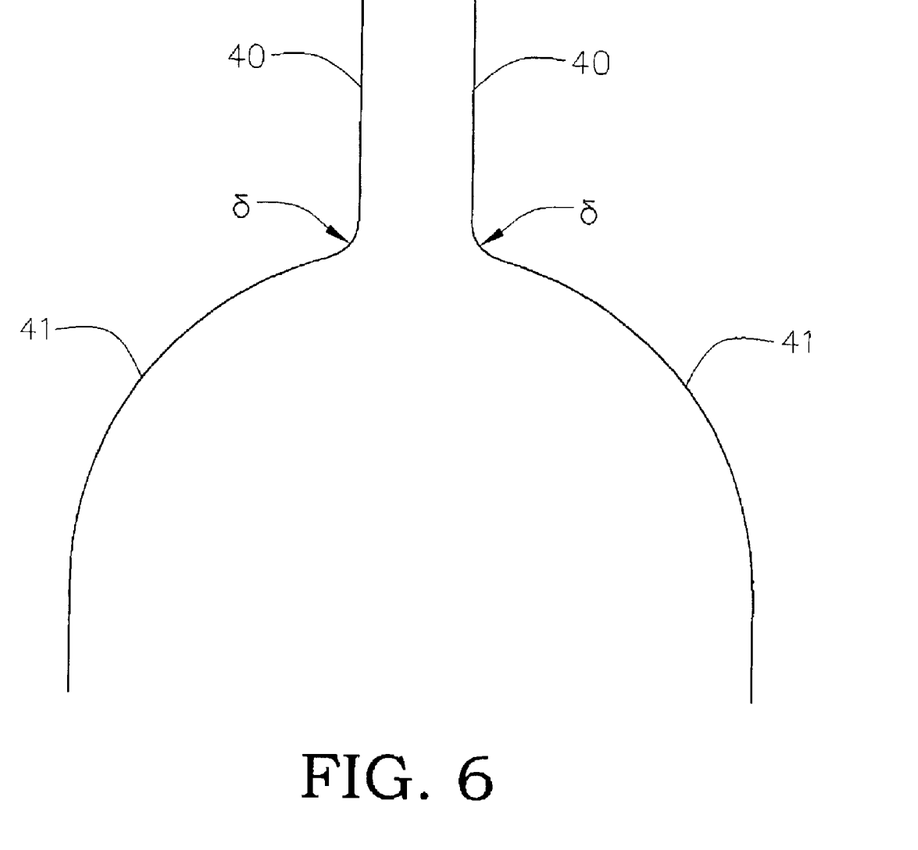
FIG. 6 is a schematic view depicting geometry of striker impact with film.

Referring now to FIG. 6, when the striker shaft 18 pulls the striker tip 17 into contact with the film, the film deforms from plane A—A and resists the impact force through uniform multidirectional tensile stresses across the thickness of the film. The angle of deflection of the film theta (θ) is defined by the angle between the clamped film in the clamped position (plane A—A) and that of the stretched film (indicated as position B—B) at the peak puncture load recorded during impact. This angle is always less than 90°. It is automatically measured and recorded by a data acquisition system in the computer (see FIG. 4). The load cell force output is recorded at a frequency of 300 kHz beginning at roughly 1 msec. prior to impact and as the striker impacts, penetrates, and punctures the film sample. Assuming that the membrane stresses are in the plane of the film (no bending stresses), and that the measured load depends upon the geometry of the striker, then the maximum stress σ may be determined by the following equation: $\sigma_{max} = P_{max}/(2\pi rT \sin \theta)$, where $P_{max}$=maximum force or load; r=radius of the circle circumscribed by the circular cross-section of the hemispherical striker as it is superimposed on the plane of the film; T=the undeformed film thickness; sin θ is the sine of the angle between the plane of the sample holder and the fully deflected film sample at the moment of puncture. The Total Energy Absorption "E" may be calculated by integrating the load displacement curve according to the following equation:

$$E = v_0 \int_0^t P dt + g \int_0^t t P dt - \frac{1}{2m}\left[\int_0^t P dt\right]^2$$

Where E is the total energy; $v_0$ is the striker speed at the moment of impact with the film sample; P is the force; t is the time from impact of the striker with the film until puncture of the film; g is gravitational acceleration; and m is the mass of the crosshead including the striker. The test is repeated and an arithmetic mean is reported for 4 samples. If necessary, the equipment dimensions such as the drop height, striker shaft length and/or mass of the crosshead assembly may be increased to test films that are resistant to puncture with the above dimensioned test apparatus. The above equations remain the same.

Following are examples and comparative examples given to illustrate the invention.

In all the following examples, unless otherwise indicated, the film compositions were produced generally utilizing the apparatus and method described in U.S. Pat. No. 3,456,044 (Pahlke) which describes a coextrusion type of double bubble method and in further accordance with the detailed description above. In the following examples, all layers were extruded (coextruded in the multilayer examples) as a primary tube which was cooled upon exiting the die e.g. by spraying with tap water. This primary tube was then reheated by radiant heaters(although alternative heating means such as conduction or convection heating may be used) with further heating to the draw (orientation) temperature for biaxial orientation accomplished by an air cushion which was itself heated by transverse flow through a heated porous tube concentrically positioned around the moving primary tube. Cooling was accomplished by means of a concentric air ring. Draw point temperature, bubble heating and cooling rates and orientation ratios were generally adjusted to maximize bubble stability and throughput for the desired amount of stretching or orientation. Use of higher throughput rates and lower draw point temperatures are believed to provide films having higher puncture resistance relative to use of lower throughputs or higher orientation temperatures.

Puncture resistance of the formulations and compositions of the present invention when made into oriented films may be dramatically affected by adjustment of the draw point temperature. The inventive films may be made with surprising and unexpectedly high puncture resistance properties including very high total energy absorption E and maximum puncture force P by carefully controlling the draw point temperature. The unique formulations of the present invention result in dramatic property improvements. The shrinkage values, shrink force, and puncture resistance properties are all strongly affected by draw point temperature. If the film is oriented at too high a temperature these properties will be unnecessarily low and not take full advantages of the invention for some uses. The best draw point temperature may be experimentally determined without undue experimentation by those skilled in the art and may depend upon the exact formulation selected, number of layers, thicknesses, orientation speeds, etc.

Figure 7:
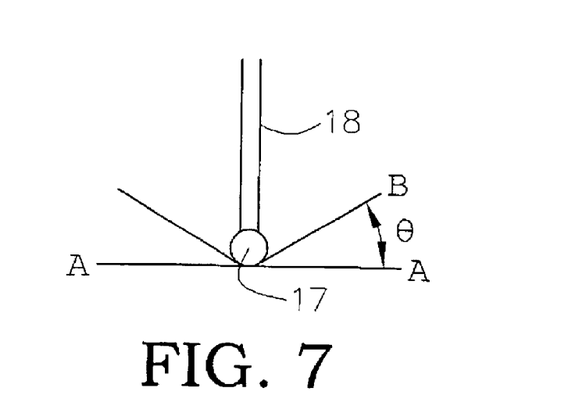
FIG. 7 is a schematic view of film tube expansion.

The puncture resistance values demonstrated by the present invention are greatly superior to many prior art films. The draw point temperature may be measured by an infrared pyrometer which is directed as close to the actual bubble expansion draw point as possible. The draw point is the point location on the primary tube that begins to stretch greatly as it transitions to a secondary bubble. Referring to FIG. 7 of the drawings a schematic view of a primary tube 40 is presented with the draw point indicated by arrows δ resulting in an expanded oriented film 41. Good films of the present invention may be made at orientation(draw point) temperatures of 183° F. and the like, but the present inventive films permit the manufacture of extraordinary films and patch bags having dramatically improved puncture properties by utilizing specially formulated films and most preferably made using low draw point temperatures, especially draw point temperatures in the range of 150 to 190° F. (65–88° C.), and preferably of from 65 to 79° C.

All percentages are by weight unless indicated otherwise.

The polymers used are identified in above Tables A–C unless otherwise noted.

EXAMPLES 1–12

Examples 1–12 are patch bags i.e. thermoplastic bags having a patch film attached thereto. Examples 1 and 2 are comparative examples not of the present invention.

In Examples 1–12 a series of patch bags are made or obtained and compared. Example 1 is a commercially acceptable patch bag comprising a three layer, biaxially stretched, heat shrinkable, coextruded, multilayer film formed into a heat sealable bag and having a monolayer patch applied to one side thereof using the high energy surface contact invention of U.S. Pat. No. 5,302,402. The patch film of Example 1 was a conventional monolayer blown film having less than 5% shrink in both machine and transverse directions and comprised a blend of: 75 wt. % Polymer K, 23 wt. % Polymer B; and 2 wt. % of a color concentrate with antiblock additive. The bag film of Example 1 was a three layer coextruded, biaxially stretched film and was made by a similar process as that used to form the bag films of inventive examples 3–12 of the present invention. The bag films of inventive examples 3–12 had the same formulation and were similarly made and various inventive patch films having a monolayer structure and comprising the novel blend of the present invention were attached to one side thereof by the high energy surface treatment process described above and their physical properties tested. Examples 1 and 2 are comparative examples not of the present invention.

For examples 1 and 3–12, the bags were made from three layer films. One extruder was used for each layer. Each extruder was connected to an annular coextrusion die from which heat plastified resins were coextruded forming a primary tube having a first inner layer, a second core layer and a third outer layer. The first and third layers being directly attached to opposing sides of the second core layer. The first/second/third layer thickness ratio was about 62:9:29.

In Examples 1 and 3–12, for each layer, the resin mixture was fed from a hopper into an attached single screw extruder where the mixture was heat plastified and extruded through a three layer coextrusion die into a primary tube. The extruder barrel temperatures for the second (core)layer was between about 248–285° F. (120–141° C.); for the first (inner)layer and for the third (outer) layer were about 290–340° F. (143–171° C.). The coextrusion die temperature profile was set from about 320° F. to 350° F. (160–177° C.). The extruded multilayer primary tube was cooled by spraying with cold tap water 50–68° F. (about 10–20° C.).

In Examples 1 and 3–12, a cooled primary tube of about 80 to 110 mm flatwidth was produced passing through a pair of nip rollers. The cooled flattened primary tube was inflated, reheated, biaxially stretched, and cooled again to produce a biaxially stretched and biaxially oriented film which was wound on a reel. The M.D. orientation ratio was about 4.5:1 to 4.9:1 and the T.D. orientation ratio was about 4.2:1 to 4.8:1 for all the films. The draw point or orientation temperature was below the predominant melting point for each layer oriented and above that layer's predominant glass transition point and is believed to be about 68–85° C. The resultant biaxially oriented bag films of Examples 1, 3–12 had an average gauge of 2.25 to 2.75 mil and had an excellent appearance.

For Example 1, the heat sealing layer was the first layer of the multilayer bag film and the inner layer of the film tube. The first layer comprised a blend of: about 30.1 wt. % of Polymer F, a copolymer predominantly of ethylene with octene-1 monomer and having properties as noted in Table A; 20.3 wt. % of Polymer C; 24.4% of Polymer Q; 4.0% of Additive BB; and 2% Additive EE.

For Examples 3–12, the heat sealing layer was the first layer of the multilayer bag film and the inner layer of the film tube. The first layer comprised a blend of: about 17 wt. % of Polymer J, a copolymer predominantly of ethylene with octene-1 monomer and having properties as noted in Table A; about 18 wt. % of Polymer C; about 58% of Polymer P; 5% of an additive similar to Additive BB; and 2% an additive similar to Additive EE.

For Examples 1, and 3–12, each core layer comprised a 5.5:1 blend of vinylidene chloride-methylacrylate copolymer and vinylidene chloride-vinyl chloride copolymer.

For Example 1, the third (outer) layer of the multilayer bag film (the outer layer of the film tube) comprised a blend of: about 50 wt. % of Polymer F, a copolymer predominantly of ethylene with octene-1 monomer and having properties as noted in Table A; about 23 wt. % of Polymer C; about 25% of Polymer Q; and about 2% of Additive FF.

For Examples 3–12, the third (outer) layer of the multilayer bag film (the outer layer of the film tube) comprised a blend of: about 19 wt. % of Polymer J, a copolymer predominantly of ethylene with octene-1 monomer and having properties as noted in Table A; about 18 wt. % of Polymer C; about 60% of Polymer P; and about 3% of an additive similar to Additive GG.

The patch films were all monolayer, biaxially stretched films made according to the above-described orientation process. For examples 3–12, the patch film formulation was blended and extruded through an annular die from which the heat plastified resin blend formed a primary tube of the blends identified below.

In Examples 3–12, the resin mixture was fed from a hopper into attached single screw extruders where the mixture was heat plastified and extruded through a die into a primary tube. The extruder barrel temperatures for were between about 290–340° F. (143–171° C.). The die temperature was set from about 320° F. to 350° F. (160–177° C.). The extruded primary tube was cooled by spraying with cold tap water 50–68° F. (about 10–20° C.).

In Examples 3–12, a cooled primary tube of about 80 to 140 mm flatwidth was produced passing through a pair of nip rollers. The cooled flattened primary tube was inflated, reheated, biaxially stretched, and cooled again to produce a biaxially stretched and biaxially oriented film which was wound on a reel. The M.D. orientation ratio was about 4.3:1 to 4.9:1 and the T.D. orientation ratio was about 4.1:1 to 4.9:1 for all the films. The draw point or orientation temperature was below the predominant melting point for each layer oriented and above that layer's predominant glass transition point and is believed to be about 68–85° C. The resultant biaxially oriented patch films of Examples 3–12 had an average gauge of 3.25 to 4.25 mil and had an excellent appearance. The tubular film was slit to form sheets and applied to the bags described above by conventional means using the above noted high surface energy method according to U.S. Pat. No. 5,302,402. The properties of these inventive patch films and patch bags were measured and are reported in the following Tables.

Example 2 was a comparative example of a commercially successful multilayer oxygen barrier patch bag suitable for packaging a variety of items including bone-in meats. For comparative Example 2, a multilayer oriented bag which is believed to be of at least 4 layers comprising various ethylene polymers and EVA with a core oxygen barrier layer comprising a vinylidenechloride copolymer of about 2.5 mil thickness is believed to have adhered thereto a 5–5.3 mil thick patch film comprising a multilayer film comprising ethylene polymer and EVA.

The flat widths (½ the circumference of the biaxially stretched film) of the tubular film were a nominal 360 mm for the biaxially stretched films of Examples 3–12.

The patch film of inventive example 3 comprised a novel blend of: 91 wt. % Polymer I; 6 wt. % Polymer T; and 3 wt. % Additive AA.

The patch film of inventive example 4 comprised a novel blend of: 67 wt. % Polymer P; 20 wt. % Polymer J; 10 wt. % Polymer T; and 3 wt. % Additive AA.

The patch film of inventive example 5 comprised a novel blend of: 67 wt. % Polymer P; 18 wt. % Polymer J; 12 wt. % Polymer T; and 3 wt. % Additive AA.

The patch film of inventive example 6 comprised a novel blend of: 67 wt. % Polymer P; 16 wt. % Polymer J; 14 wt. % Polymer T; and 3 wt. % Additive AA.

The patch film of inventive example 7 comprised a novel blend of: 67 wt. % Polymer P; 16 wt. % Polymer I; 14 wt. % Polymer T; and 3 wt. % Additive AA.

The patch film of inventive example 8 comprised a novel blend of: 67 wt. % Polymer P; 16 wt. % Polymer J; 14 wt. % Polymer S; and 3 wt. % Additive AA.

The patch film of inventive example 9 comprised a novel blend of: 67 wt. % Polymer P; 16 wt. % Polymer J; 14 wt. % Polymer U; and 3 wt. % Additive AA.

The patch film of inventive example 10 comprised a novel blend of: 67 wt. % Polymer P; 16 wt. % Polymer J; 14 wt. % Polymer V; and 3 wt. % Additive AA.

The patch film of inventive examples 11 and 12 comprised a novel blend of: 67 wt. % Polymer P; 18 wt. % Polymer I; 12 wt. % Polymer T; and 3 wt. % Additive AA. The patch film of Example 11 differed from that of Example 12 in thickness. In Example 11 the patch film was 3.65 mil thick; and in Example 12 the patch film was 4.31 mils thick.

The multilayer bag films of Examples 1, and 3–12 were irradiated after orientation by electron beam according to methods well known in the art. The bag film of Example 1 was irradiated to a level of about 5 Mrad. The bag films of Examples 3–12 were irradiated to a level of about 3.8 Mrad. The bag film of comparative example 2 is believed to have been irradiated in part. The patch films of Examples 1, and 3–12 were not irradiated, and the patch film of comparative example 2 is believed to not have been irradiated.

Physical properties of the patch films and bags were tested and are reported in the following Tables. Tables 1 and 2 report properties of the laminate i.e. the bag and adhered patch structure. Table 3 reports properties of the patch film alone, which also has utility for packaging and may itself be made into bags.

TABLE 1

| Ex. No. | AVG. GAUGE mil (μ) | RAM PUNCTURE Force Newtons | RAM PUNCTURE Stress MPa | RAM PUNCTURE Total Energy Joules | BED OF NAILS % Failure | SHRINK at 90° C. % MD/TD | SHRINK at 80° C. % MD/TD | SECANT MODULUS MPa MD/TD | HAZE % | Light Transmission % | TEAR STRENGTH g/mil (g/μ) MD/TD |
|---|---|---|---|---|---|---|---|---|---|---|---|
| 1 | 9.81 (249) | 165 | 99 | 1.63 | 100 | | | 127/119 | ND | 55.5 | NT/NT |
| 2 | 7.20 (183) | 225 | 205 | 1.92 | 94 | 16/25 | 10/15 | 209/217 | 27.4 | ND | NT/30 (NT/1.2) |
| 3 | 7.55 (192) | 283 | 201 | 3.27 | 72 | 39/46 | 24/33 | 153/174 | 11.2 | ND | NT/NT |
| 4 | 6.71 (170) | 325 | 243 | 4.63 | 16 | 42/51 | 26/36 | 201/179 | 14.5 | ND | 30/29 (1.2/1.1) |
| 5 | 7.11 (181) | 331 | 226 | 4.62 | 10 | 45/50 | 28/36 | 202/184 | ND | 89.5 | 26/28 (1.0/1.1) |
| 6 | 6.96 (177) | 318 | 214 | 4.77 | 10 | 42/49 | 25/34 | 216/233 | ND | 89.4 | 29/26 (1.1/1.0) |
| 7 | 6.92 (176) | 319 | 221 | 4.39 | 26 | 44/50 | 26/36 | 202/203 | ND | 89.9 | 30/28 (1.2/1.1) |
| 8 | 7.23 (184) | 355 | 252 | 4.88 | 10 | 44/48 | 25/31 | 190/200 | ND | 90.1 | 24/23 (0.94/0.91) |
| 9 | 7.12 (181) | 347 | 254 | 4.71 | 14 | 41/47 | 25/33 | 215/198 | ND | 88.8 | 28/22 (1.1/0.87) |
| 10 | 6.84 (174) | 327 | 226 | 4.48 | 10 | 40/47 | 27/37 | 178/208 | ND | 89.5 | NT/NT |
| 11 | 7.03 (179) | 337 | 235 | 4.79 | 26 | 43/49 | 26/36 | 177/184 | ND | 90.2 | 22/18 (0.87/0.71) |
| 12 | 7.51 (191) | 353 | 221 | 5.30 | 8 | 43/48 | 26/36 | 194/175 | ND | 89.7 | 23/18 (0.91/0.71) |

ND = Not Determined
NT = No Tear

TABLE 2

| Ex. No. | TENSILE STRENGTH at RT MPa MD/TD | ELONGATION AT BREAK at RT % MD/TD | SHRINK FORCE AT 90° C. g/mil (g/μ) MD/TD | SHRINK FORCE AT RT g/mil (g/μ) MD/TD | GLOSS at 45° Angle | IRRADIATION Mrad Bag/Patch |
|---|---|---|---|---|---|---|
| 1 | 33/29 NB/NB | 438/438 NB/NB | 56/36 (2.2/1.4) | 44/32 (1.7/1.3) | 27 | 5/0 |
| 2 | 64/87 | 244/257 | 108/157 (4.3/6.2) | 94/127 (3.7/5.0) | 57 | ND |
| 3 | 74/83 | 300/342 | 150/182 (5.9/7.2) | 86/110 (3.4/4.3) | 76 | 3.75/0 |
| 4 | | | | | | 3.75/0 |
| 5 | | | | | | 3.75/0 |
| 6 | | | | | | 3.75/0 |
| 7 | | | | | | 3.75/0 |
| 8 | | | | | | 3.75/0 |
| 9 | | | | | | 3.75/0 |
| 10 | | | | | | 3.75/0 |
| 11 | | | | | | 3.75/0 |
| 12 | | | | | | 3.75/0 |

RT = Room Temperature (~20–23° C.)
NB = No Break
ND = Not Determined

TABLE 3

| Ex. No. | AVG. GAUGE mil (μ) | RAM PUNCTURE Force Newtons | RAM PUNCTURE Stress MPa | RAM PUNCTURE Total Energy Joules | SHRINK at 90° C. % MD/TD | SHRINK at 80° C. % MD/TD | SECANT MODULUS psi × 10³ MD/TD | HAZE % | Light Transmission % | GLOSS at 45° Hunter Units (H.U.) |
|---|---|---|---|---|---|---|---|---|---|---|
| 1 | 7.04 | 42 | 37 | 0.51 | 0/0 | 0/0 | 13.8/13.5 | ND | 74 | 27 |
| 2 | 7.20 | 155 | ND | 1.33 | ND | ND | ND | ND | ND | ND |
| 3 | 5.59 | 174 | 223 | 1.68 | 39/45 | ND | 15.6/16.9 | 4.7 | ND | 79 |
| 4 | 6.71 | 251 | 331 | 3.97 | 46/54 | 28/38 | 22.9/23.4 | 5.5 | ND | 76 |
| 5 | 7.11 | 252 | 320 | 4.33 | 48/55 | 30/38 | 23.6/23.4 | 7.8 | ND | 74 |
| 6 | 6.96 | 234 | 328 | 3.08 | 48/55 | 28/39 | 24.6/24.8 | 9.0 | ND | 74 |
| 7 | 6.92 | 229 | 296 | 3.51 | 50/57 | 32/41 | 22.3/24.7 | 8.0 | ND | 76 |
| 8 | 7.23 | 255 | 324 | 4.10 | 47/55 | 29/39 | 23.5/25.4 | 5.2 | ND | 81 |
| 9 | 7.12 | 231 | 301 | 3.89 | 47/54 | 31/39 | 21.5/22.9 | 8.5 | ND | 64 |
| 10 | 6.84 | 216 | 286 | 4.55 | 49/56 | 31/41 | 19.4/20.7 | 7.9 | ND | 76 |

TABLE 3-continued

| | | RAM PUNCTURE | | | SHRINK at 90° C. | SHRINK at 80° C. | SECANT | | | GLOSS |
|---|---|---|---|---|---|---|---|---|---|---|
| Ex. No. | AVG. GAUGE mil ($\mu$) | Force Newtons | Stress MPa | Total Energy Joules | % MD/TD | % MD/TD | MODULUS psi × 10³ MD/TD | HAZE % | Light Transmission % | at 45° Hunter Units (H.U.) |
| 11 | 7.03 | 223 | 288 | 4.71 | 50/58 | 31/42 | 21.8/22.7 | 6.3 | ND | 76 |
| 12 | 7.51 | 245 | 275 | 3.54 | 50/57 | 31/41 | 19.6/20.5 | 6.2 | ND | 75 |

ND = Not Determined
NT = No Tear

Referring to the properties shown in the above Tables it is readily apparent that the inventive blends, films, and patch bags not only may be usefully employed, but also possess surprisingly superior resistance to puncture as demonstrated by very high puncture resistance values. These films and patch nags demonstrate highly useful combinations of advantageous physical properties especially high shrinkage values, excellent optical properties, very desirable modulus or stiffness values in addition to the puncture resistance. The patch bags show through the bed of nails test in which a wooden block with steel spikes having sharpened points are placed within a patch bag facing the side having the external patch. The bag is evacuated, sealed and the patch bag is placed in a water bath shrink tunnel at elevated temperatures causing the bag to shrink about the block. Under this very severe test prior art commercial patch bags are greatly inferior to the present invention which demonstrated unexpected and amazingly good resistance to puncture.

Blends, films, bags and packages of the present invention may also employ combinations of characteristics as described in one or more of the claims including dependent claims which follow this specification and, where not mutually exclusive, the characteristics and limitations of each claim may be combined with characteristics or limitations of any of the other claims to further describe the invention.

The above examples serve only to illustrate the invention and its advantages, and they should not be interpreted as limiting since further modifications of the disclosed invention will be apparent to those skilled in the art in view of this teaching. All such modifications are deemed to be within the scope of the invention as defined by the following claims.

What is claimed is:

1. A patch bag comprising:
   (a) a bag having an inside surface and an, outside surface, said bag comprising a flexible, thermoplastic, biaxially stretched, heat shrinkable film having at least one layer comprising a blend of at least three copolymers comprising:
   45 to 85 weight percent of a first polymer having a melting point of from 55 to 98° C. comprising at least one copolymer of ethylene and at least one comonomer selected from the group of hexene-1 and octene-1;
   5 to 35 weight percent of a second polymer having a melting point of from 115 to 128° C. comprising at least one copolymer of ethylene and at least one a-olefin; and
   10 to 50 weight percent of a third polymer having a melting point of from 60 to 110° C. comprising at least one unmodified or anhydride-modified copolymer of ethylene and a vinyl ester, acrylic acid, methacrylic acid, or an alkyl acrylate; wherein said first and second polymers have a combined weight percentage of at least 50 weight percent, said weight percentage being based upon the total weight of said first, second and third polymers; and wherein said film has a total energy absorption of at least 0.70 Joule and a shrinkage value at 90° C. of at least 50% in at least one of the machine and transverse directions; and
   (b) a patch film attached to at least one surface of said bag and covering at least 25% of said surface, said patch film comprising a flexible, thermoplastic film having at least one layer comprising a blend of at least two polymers comprising:
   5 to 20 weight percent of (i) an ionomer polymer;
   5 to 95 weight percent of (ii) a copolymer of ethylene and at least one $C_6$ to $C_8$ a-olefin, wherein said copolymer (ii) has a melting point of from 55 to 95° C., and a $\overline{M}_w/\overline{M}_n$ of from 1.5 to 3.5;
   0 to 90 weight percent of (iii) a copolymer of ethylene and at least one C4 to $C_8$ a-olefin, wherein said copolymer (iii) has a melting point of from 100 to 125° C.; and
   0 to 90 weight percent of (iv) a copolymer of propylene and at least one monomer selected from the group of ethylene and butene-1, wherein said copolymer (iv) has a melting point of from 105 to 145° C.;
   0 to 90 weight percent of (v) a copolymer of ethylene and at least one monomer selected from the group of hexene-1, octene-1 and decene-1, wherein said copolymer (v) has a melting point of from 125 to 135° C.; and wherein said polymers (ii), (iii), (iv), and (v) have a combined weight percentage of at least 80 weight percent; said weight percentages of polymers (i), (ii), (iii), (iv), and (v) being based upon the total weight of said polymers (i), (ii), (iii), (iv), and (v); and wherein said patch bag has a total energy absorption of at least 1.2 Joule through a patch covered bag area.

2. A patch bag, as defined in claim 1, wherein said patch film is biaxially stretched and heat shrinkable.

3. A patch bag, as defined in claim 2, wherein said patch film has a shrinkage value at 90° C. of at least 20% in at least one of the machine and transverse directions.

4. A patch bag, as defined in claim 2, wherein said patch film has a shrinkage value at 90° C. of at least 50% in at least one of the machine and transverse directions.

5. A patch bag, as defined in claim 1, wherein said patch film copolymer (iii) has a $\overline{M}_w/\overline{M}_n$ greater than 3.0.

6. A patch bag, as defined in claim 1, wherein said first polymer of said bag is a copolymer of ethylene and hexene-1.

7. A patch bag, as defined in claim 1, wherein said first polymer of said bag is a copolymer of ethylene and octene-1.

8. A patch bag, as defined in claim 1, wherein said first polymer of said bag is a copolymer of ethylene, butene-1 and hexene-1.

9. A patch bag, as defined in claim 1, wherein said first polymer of said bag has a melting point of 80 to 98° C.

10. A patch bag, as defined in claim 1, wherein said first polymer of said bag has a melting point of 55 to 95° C.

11. A patch bag, as defined in claim 1, wherein said ionomer comprises a zinc or sodium metal salt of an ethylene methacrylic acid copolymer.

12. A patch bag, as defined in claim 1, wherein said patch film is a monolayer film.

13. A patch bag, as defined in claim 12, wherein said patch film is a flattened tubular film.

14. A bag comprising:
(a) a bag having an inside surface and an outside surface, said bag comprising a flexible, thermoplastic, biaxially stretched, heat shrinkable film having at least one layer comprising a blend of at least three copolymers comprising:
45 to 85 weight percent of a first polymer having a melting point of from 55 to 98° C. comprising at least one copolymer of ethylene and at least one comonomer selected from the group of hexene-1 and octene-1;
5 to 35 weight percent of a second polymer having a melting point of from 115 to 128° C. comprising at least one copolymer of ethylene and at least one a-olefin; and
10 to 50 weight percent of a third polymer having a melting point of from 60 to 110° C. comprising at least one unmodified or anhydride-modified copolymer of ethylene and a vinyl ester, acrylic acid, methacrylic acid, or an alkyl acrylate; wherein said first and second polymers have a combined weight percentage of at least 50 weight percent, said weight percentage being based upon the total weight of said first, second and third polymers; and wherein said film has a total energy absorption of at least 0.70 Joule and a shrinkage value at 90° C. of at least 50% in at least one of the machine and transverse directions; and
(b) a first laminate film having a width equal to or greater than the bag flat width, said film attached to at least one surface of said bag and covering one side of said bag, said laminate film comprising a flexible, thermoplastic film having at least one layer comprising a blend of at least two polymers comprising:
5 to 20 weight percent of (i) an ionomer polymer,
5 to 95 weight percent of (ii) a copolymer of ethylene and at least one $C_6$ to $C_8$ a-olefin, wherein said copolymer (ii) has a melting point of from 55 to 95° C., and a $\overline{M}_w/\overline{M}_n$ of from 1.5 to 3.5;
0 to 90 weight percent of (iii) a copolymer of ethylene and at least one $C_4$ to $C_8$ a-olefin, wherein said copolymer (iii) has a melting point of from 100 to 125° C.; and
0 to 90 weight percent of (iv) a copolymer of propylene and at least one monomer selected from the group of ethylene and butene-1, wherein said copolymer (iv) has a melting point of from 105 to 145° C.;
0 to 90 weight percent of (v) a copolymer of ethylene and at least one monomer selected from the group of hexene-1, octene-1 and decene-1, wherein said copolymer (v) has a melting point of from 125 to 135° C.; and wherein said polymers (ii), (iii), (iv), and (v) have a combined weight percentage of at least 80 weight percent; said weight percentages of polymers (i), (ii), (iii), (iv), and (v) being based upon the total weight of said polymers (i), (ii), (iii), (iv), and (v); and wherein said bag has a total energy absorption of at least 1.2 Joule through a laminate film covered bag area.

15. A bag, as defined in claim 14, wherein said laminate film is biaxially stretched and heat shrinkable, having a shrinkage value at 90° C. of at least 20% in at least one of the machine and transverse directions.

16. A bag, as defined in claim 15, wherein said laminate film has a shrinkage value at 90° C. of at least 50% in at least one of the machine and transverse directions.

17. A bag, as defined in claim 14, further comprising a second laminate film, attached to at least one flatwidth surface of an opposing side of said bag relative to the side having said first laminate and said second laminate covering at least 25% of said surface, said second laminate film comprising a flexible, thermoplastic film having at least one layer comprising a blend of at least two polymers comprising:
5 to 20 weight percent of (i) an ionomer polymer;
5 to 95 weight percent of (ii) a copolymer of ethylene and at least one $C_6$ to $C_8$ a-olefin, wherein said copolymer (ii) has a melting point of from 55 to 95° C., and a $\overline{M}_w/\overline{M}_n$ of from 1.5 to 3.5;
0 to 90 weight percent of (iii) a copolymer of ethylene and at least one $C_4$ to $C_8$ a-olefin, wherein said copolymer (iii) has a melting point of from 100 to 125° C.; and
0 to 90 weight percent of (iv) a copolymer of propylene and at least one monomer selected from the group of ethylene and butene-1, wherein said copolymer (iv) has a melting point of from 105 to 145° C.;
0 to 90 weight percent of (v) a copolymer of ethylene and at least one monomer selected from the group of hexene-1, octene-1 and decene-1, wherein said copolymer (v) has a melting point of from 125 to 135° C.; and wherein said polymers (ii), (iii), (iv), and (v) have a combined weight percentage of at least 80 weight percent; said weight percentages of polymers (i), (ii), (iii), (iv), and (v) being based upon the total weight of said polymers (i), (ii), (iii), (iv), and (v); and wherein said bag has a total energy absorption of at least 1.2 Joule through a laminate bag area.

18. A bag, as defined in claim 17, wherein said second laminate film is biaxially stretched and heat shrinkable.

19. A bag, as defined in claim 18, wherein said second laminate film has a shrinkage value at 90° C. of at least 20% in at least one of the machine and transverse directions.

20. A bag, as defined in claim 18, wherein said second laminate film has a shrinkage value at 90° C. of at least 50% in at least one of the machine and transverse directions.

21. A bag, as defined in claim 17, wherein said second laminate has a width equal to said bag's flatwidth.

22. A bag, as defined in claim 21, wherein said second laminate has a width greater than said bag's flatwidth.

23. A bag, as defined in claim 14, wherein said first laminate has a width greater than said bag's flatwidth.

* * * * *